(12) United States Patent
Choi (10) Patent No.: US 9,574,871 B2
(45) Date of Patent: Feb. 21, 2017

(54) METHOD AND SYSTEM FOR MEASURING LENGTH, USING MOBILE TERMINAL

(71) Applicant: GERWOOL SOFTWARE INC., Forest Hills, NY (US)

(72) Inventor: Jinwon Choi, Gyeonggi-do (KR)

(73) Assignee: GERWOOL SOFTWARE INC., Forest Hills, NY (US)

(*) Notice: Subject to any disclaimer, the term of this patent is extended or adjusted under 35 U.S.C. 154(b) by 239 days.

(21) Appl. No.: 14/530,422

(22) Filed: Oct. 31, 2014

(65) Prior Publication Data

US 2015/0124085 A1    May 7, 2015

(30) Foreign Application Priority Data

Nov. 5, 2013    (KR) .................. 10-2013-0133423

(51) Int. Cl.
    *G01B 11/02* (2006.01)
    *G01B 21/02* (2006.01)
    *G01B 21/04* (2006.01)

(52) U.S. Cl.
    CPC ........... *G01B 11/022* (2013.01); *G01B 11/026* (2013.01); *G01B 21/045* (2013.01)

(58) Field of Classification Search
    CPC ....... G01B 11/00; G01B 11/02; G01B 11/245; G01B 11/002; G01B 11/03; G01B 11/2433; G01B 11/2518; G01B 21/02
    See application file for complete search history.

(56) References Cited

U.S. PATENT DOCUMENTS 8,923,650 B2 * 12/2014 Wexler .................. G01C 11/04
                                                    382/286

FOREIGN PATENT DOCUMENTS

| CA | 2171484 A1 * | 11/1997 | ............ G01B 11/28 |
| CN | 102763923 A * | 11/2012 | |
| DK | WO 2014053137 A1 * | 4/2014 | ............ G01B 11/02 |
| JP | 2010-008352 A | 1/2010 | |
| KR | 10-2006-0031730 | 4/2006 | |
| KR | 10-0652685 B1 | 12/2006 | |
| KR | 10-2009-0052717 | 5/2009 | |

* cited by examiner

Primary Examiner — William C Vaughn, Jr.
Assistant Examiner — Lindsay Uhl
(74) Attorney, Agent, or Firm — Revolution IP, PLLC (57) ABSTRACT

A user measures a length of a target using a mobile terminal and measure a length, irrespective of time and place. The mobile terminal and the target are photographed together in front of the mirror, and a size of the target is estimated using a ratio of the pictured size versus the actual size of the mobile terminal. The actual size of the target is calculated by adjusting the estimated length with an error associated with a difference between a distance from the mirror to the mobile terminal and a distance from the mirror to the target, and thus, a length is more accurately measured. In addition, the error associated with the distance is corrected based on the photographed picture and data stored in a database and thus, a separate distance measurement sensor for correcting the distance is not required and the cost may be reduced.

13 Claims, 5 Drawing Sheets

| MTO / MTP | 70cm | 90cm |
|---|---|---|
| 30cm | 59% | 49% |
| 50cm | 81% | 69% |

METHOD AND SYSTEM FOR MEASURING LENGTH, USING MOBILE TERMINAL

CROSS-REFERENCE TO RELATED APPLICATION

This application claims priority from and the benefit under 35 U.S.C. §119(a) of Korean Patent Application No. 10-2013-0133423, filed on Nov. 5, 2013, which is hereby incorporated by reference for all purposes as if fully set forth herein.

BACKGROUND OF THE INVENTION

1. Field of the Invention

The present invention relates to a method and system for measuring a length using a mobile terminal, and more particularly, to a method and system for measuring a length using a mobile terminal that measures a length of a target of measurement.

2. Description of the Prior Art

Rapidly increased use of a mobile terminal enables continuous development of various functions that may be utilized for the real life using the mobility of the mobile terminal. Among those functions, various length measuring methods using the mobile terminal have been provided.

According to Korean Patent No. 10-0652685, the disclosure provides a method of calculating the actual length of a target of measurement based on the distance to the target of measurement, obtained using a distance measurement sensor, and an image of the target of measurement photographed using a camera.

However, a general mobile terminal does not include a sensor for measuring a distance, such as, a ultrasonic sensor, a infrared sensor, and the like, and thus, the user of the general mobile terminal cannot utilize the described function. In addition, the sensor, such as the ultrasonic sensor, the infrared sensor, and the like is expensive and thus, when the expensive sensor is installed in the mobile terminal, the price of the mobile terminal may be increased.

SUMMARY OF THE INVENTION

An aspect of the present invention is to provide a method and system for measuring a length using a mobile terminal that may readily measure the length of a target of measurement.

In accordance with an aspect of the present invention, a method of measuring a length using a mobile terminal is provided. The method includes: photographing, by a user, a picture of the mobile terminal and a target of measurement together in front of a mirror, using a camera of the mobile terminal; obtaining a ratio of a size of the mobile terminal in the picture to an actual size of the mobile terminal, and estimating a length of the target of measurement from a size of the target of measurement in the picture, using the ratio; and calculating an actual length of the target of measurement based on the estimated length and a difference between a distance from the mirror to the mobile terminal and a distance from the mirror to the target of measurement.

In accordance with another aspect of the present invention, a length measurement system is provided. The system includes: a camera that is included in a mobile terminal and photographs a target of measurement in front of a mirror; a database that stores an actual size of the mobile terminal and error data associated with a difference between a distance from the mirror to the mobile terminal and a distance from the mirror to the target of measurement; and a calculator that obtains a ratio of a size of the mobile terminal in the picture to the actual size of the mobile terminal, based on the picture photographed by the camera, estimates a length of the target of measurement from the size of the target of measurement in the picture using the ratio, and adjusts the estimated length with the error data, so as to calculate an actual length of the target of measurement.

According to embodiments of the present invention, a user measures a length of a target of measurement using a mobile terminal and thus, may readily measure a length, irrespective of time and place.

In addition, according to embodiments of the present invention, a mobile terminal and a target of measurement are photographed together in front of a mirror, and a size of the target of measurement is estimated using a ratio of a size of the mobile terminal in a picture to an actual size of the mobile terminal, and thus, the measurement is readily executed.

In addition, according to embodiments of the present invention, an actual size of a target of measurement is calculated by adjusting the estimated length with an error associated with a difference between a distance from a mirror to a mobile terminal and a distance from the mirror to the target of measurement and thus, a length is more accurately measured.

In addition, according to embodiments of the present invention, an error associated with a distance is corrected based on a photographed picture and data stored in a database and thus, a separate distance measurement sensor for correcting the distance is not required and the cost may be reduced.

In addition, according to embodiments of the present invention, a general mobile terminal that does not include a distance measurement sensor may measure a length.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF THE EXEMPLARY EMBODIMENTS

Hereinafter, embodiments of the present invention will be described with reference to accompanying drawings.

Figure 1:
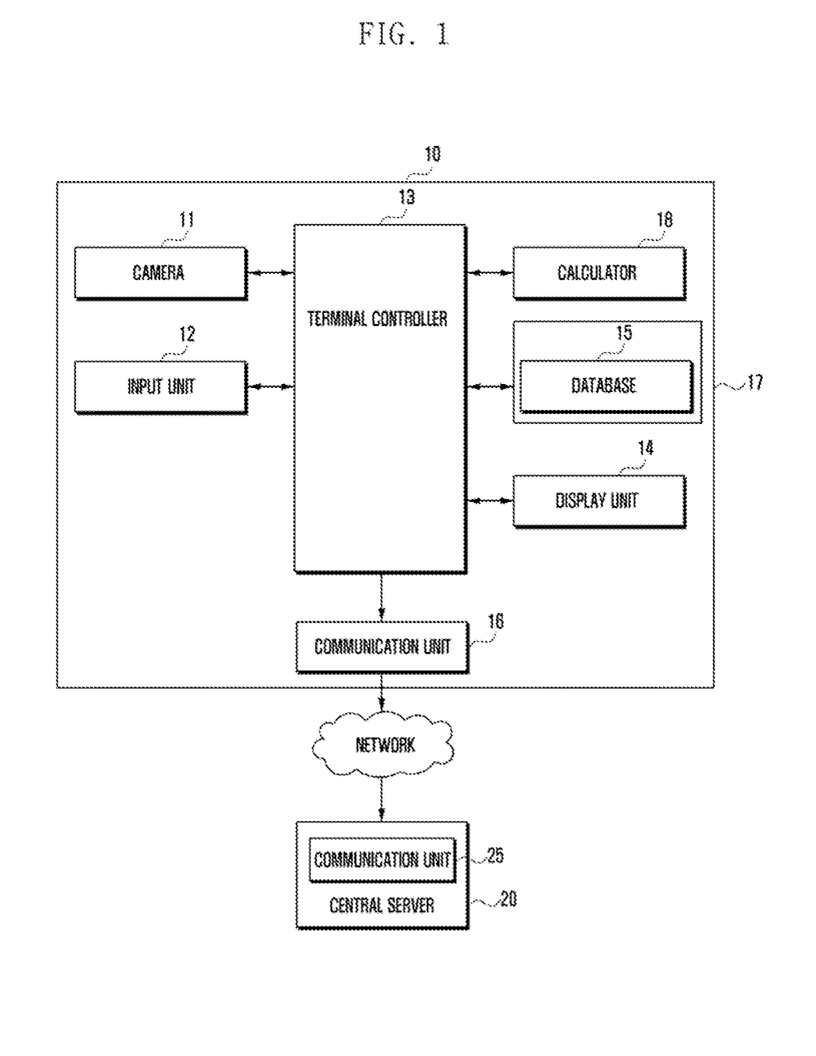
FIG. 1 is a block diagram schematically illustrating a length measurement system according to an embodiment of the present invention.

Referring to FIG. 1, a length measurement method using a mobile terminal according to an embodiment of the present invention may include a mobile terminal 10 including a camera 11, an input unit 12, a terminal controller 13, a display unit 14, a memory unit 17, a database 15, a calculator 18, and a terminal communication unit 16.

The mobile terminal 10 includes various terminals equipped with the camera 11, such as a portable phone, a net book, a tablet Personal Computer (PC), and the like. In addition, the mobile terminal 10 includes a camera equipped with a communication function.

The camera 11 is a device that is included in the mobile terminal 10, and is used for photographing a target which is desired to be measured by a user. Here, the target of measurement may include various daily necessities, school supplies, furniture, a body part, or the like.

The input unit 12 is included in the mobile terminal 10, and selects or inputs information desired by the user, and has a function for editing an image photographed by the camera 11. The input unit 12 includes a button including a number or a character, or a touch unit that is included in the display unit 14 and to which a touch of a finger or a pen is input. The user may input an actual size (length) of the mobile terminal 10 through the input unit 12.

The terminal controller 13 executes a control to store the image photographed by the camera 11 in the memory unit 17, controls the calculator 18 to calculate an actual length of the target of measurement according to the method to be described below, and controls the display unit 14 to display the calculated actual length of the target of measurement.

The display unit 14 displays the image photographed by the camera 11, information input through the input unit 12, and the like. The display unit 14 may include a screen providing visual expression through a character or an image and a speaker providing acoustic expression through sound.

The memory unit 17 stores an image photographed by the camera 11, or an estimated length or an actual length of the target of measurement, calculated according to the method to be described below. The memory unit 17 includes the database 15.

In the database 17, device type and model information of the mobile terminal 10, error data obtained in advance through experimentation, based on a distance between the mirror and the mobile terminal and a distance between the mirror and the target of measurement, distance data associated with a distance between the mirror and the mobile terminal, obtained in advance through experimentation, based on a ratio of a size of the mobile terminal 10 in the picture and an actual size of the mobile terminal 10, and the like are stored in advance. The device type and model information of the mobile terminal 10 includes actual sizes of various types of mobile terminals 10 that are commonly used. The actual size of the mobile terminal 10 includes a horizontal length, a vertical length, a thickness, a shape, and the like. Information stored in the database 15 may be updated through communication between the mobile terminal 10 and a central server 20 that is to be described below.

The terminal communication unit 16 transmits and receives information to/from a server communication unit 25 of the central server 20. The terminal communication unit 16 transmits and receives information to/from the server communication unit 25, through a mobile network. The terminal communication unit 16 and the server communication unit 25 may directly transmit and receive information without using the mobile network.

The calculator 18 obtains a ratio of the size of the mobile terminal in the picture to the actual size of the mobile terminal 10 based on the picture photographed by the camera 11, estimates a length of the target of measurement from the size of the target of measurement in the picture, using the ratio, and calculates an actual length of the target of measurement by adjusting the estimated length with the error data. Although the present embodiment exemplifies that the calculator 18 is included in the mobile terminal 10, this may not be limited thereto, and the calculator 18 may be included in the central server 20.

The central server 20 is a type of computer including a server communication unit 25 that communicates with the terminal communication unit 16 through the mobile network. The central server 20 may be a computer of a telecommunication company that provides the mobile network, or may be a computer of a company that provides a length measurement Application (App.) which provides a length measurement method to be described below.

A length measurement method according to an embodiment of the present invention configured as described above will be described as follows.

Figure 4:
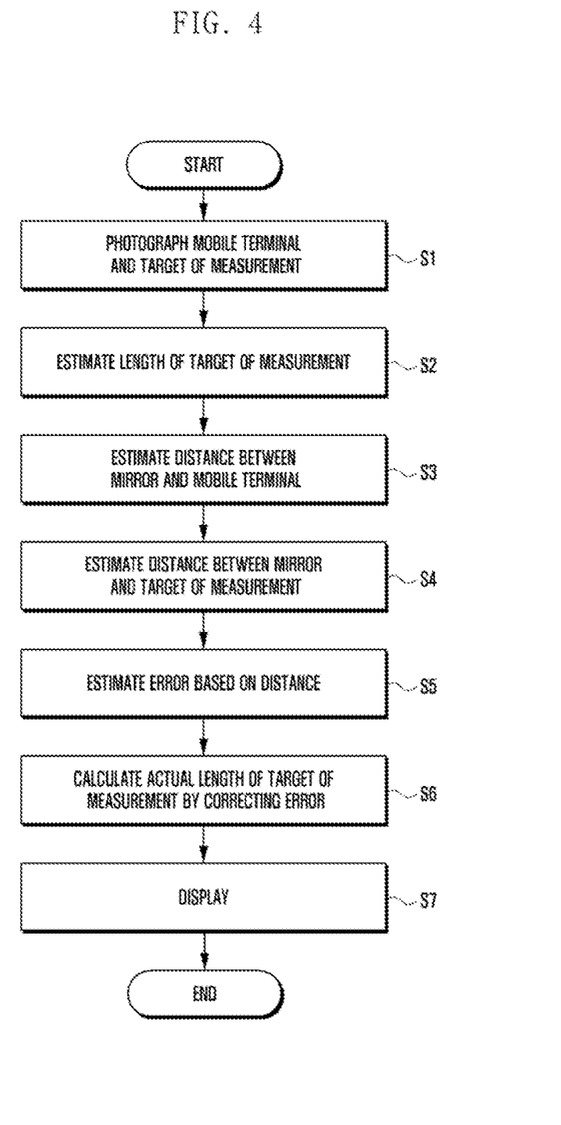
FIG. 4 is a flowchart illustrating a length measurement method according to an embodiment of the present invention.

Referring to FIG. 4, a user photographs a target 30 of measurement using the camera 11 of the mobile terminal 10 in operation S1. Although the present embodiment exemplifies that the target 30 of measurement is a rectangular parallelepiped shape, this may not be limited thereto, and may be applied to various shapes.

When the target 30 of measurement is photographed, guidance about a photographing method may be displayed through the display unit 14. The guidance may be provided through voice or characters. Although the present embodiment exemplifies that the guidance is provided through voice since the user has difficulty in viewing the mobile terminal 10 during photographing, this may not be limited thereto, and may be provided through both characters and voice. The photographing method may include information associated with a relative position of the mobile terminal 10 and the target 30 of measurement, and information associated with a resolution for photographing. The photographing method provides guidance helping the user photograph the mobile terminal 10 and the target 30 of measurement, together.

In the photographing operation, the user may photograph at least one of a front side picture and a lateral side picture of the target 30 of measurement. The present embodiment exemplifies that the front side picture and the lateral side picture of the target 30 of measurement are photographed.

Figure 2:
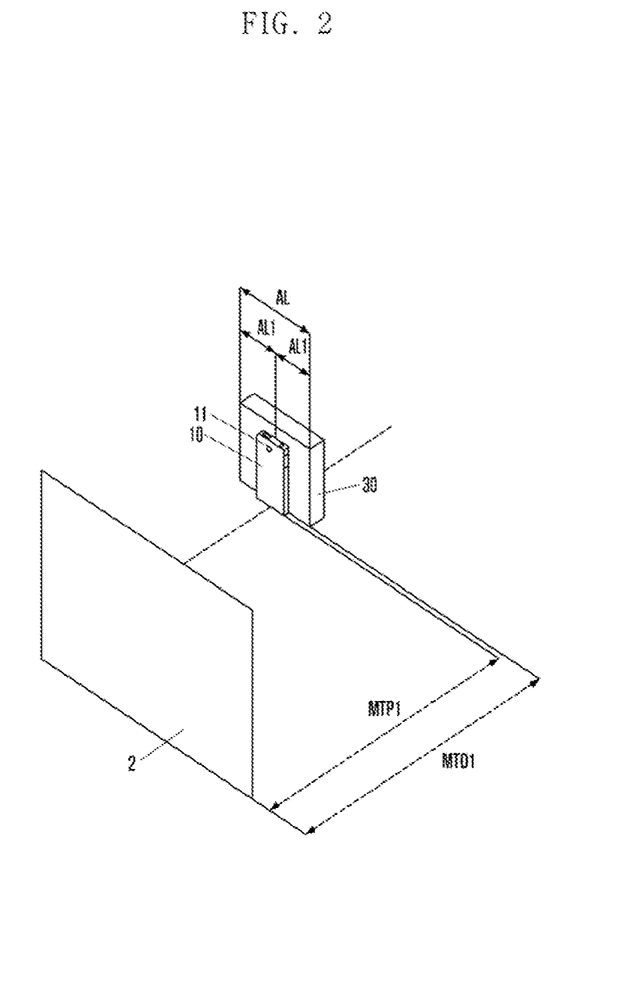
FIG. 2 is a diagram illustrating photographing of a front side picture of a target of measurement in a length measurement method according to an embodiment of the present invention.

Referring to FIG. 2, when the user photographs the front side picture of the target 30 of measurement, the user disposes the target 30 of measurement, in front of the mirror 2, in the forward direction where the target 30 of measurement faces the mirror 2, matches the center of the front side of the mobile terminal 10 to the center of the front side of the target 30 of measurement, and photographs the front side picture of the target 30 of measurement. When the mobile terminal 10 is in contact with the target 30 of measurement or when a distance between the mobile terminal 10 and the target 30 of measurement is relatively close, in the front side picture, a difference between a distance (Mirror To Phone (MTP)) from the mirror 2 to the mobile terminal 10 and a distance (Mirror To Object (MTO)) from the mirror 2 to the target 30 of measurement may be ignored. In this instance, an error (Phone Distance Adjustment (PDA)) may not need to be corrected and thus, a length may be measured only through the front side picture. There may be a case of having difficulty in matching a location between the mobile terminal 10 and the target 30 of measurement during photographing the front side picture, and thus, a distance between the mobile terminal 10 and the target 30 of measurement is significantly distant. In this instance, the error (PDA) between the distance (MTP) from the mirror 2 to the mobile terminal 10 and the distance (MTO) from the mirror 2 to the target 30 of measurement may need to be corrected and thus, the lateral side picture is need to be photographed in addition to the front side picture.

Figure 3:
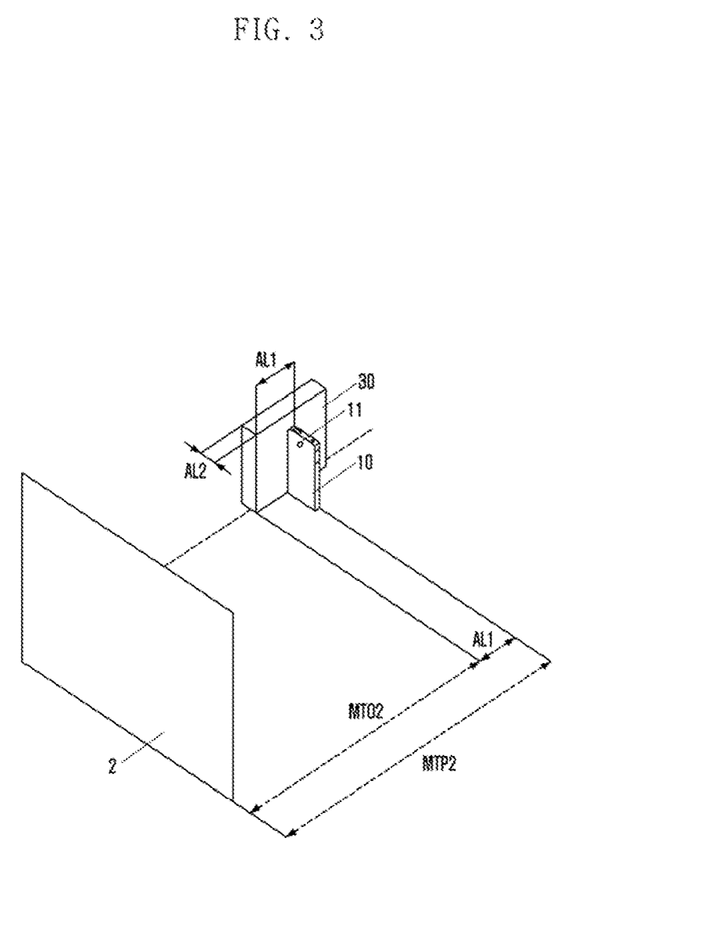
FIG. 3 is a diagram illustrating photographing of a lateral side picture of a target of measurement in a length measurement method according to an embodiment of the present invention.

Referring to FIG. 3, when the user photographs the lateral side picture of the target 30 of measurement, the user disposes the target 30 of measurement in a lateral direction from the mirror 2, in front of the mirror 2, matches the center of the lateral side of the mobile terminal 30 to the center of the front side of the target 30 of measurement, and photographs the lateral side picture of the target 30 of measurement. Referring to FIGS. 2 and 3, although it has been exemplified that the front side picture and the lateral side picture of the target 30 of measurement are photographed, this may not be limited thereto, and photographing is executed in various methods based on a shape or a size of the target 30 of measurement. The photographed picture is stored in the memory unit 17.

When photographing is completed, the calculator 18 obtains a ratio of the size of the mobile terminal 10 in the picture to the actual size of the mobile terminal 10 from the photographed picture, and estimates a length of the target 30 of measurement from the size of the target 30 of measurement in the picture, using the ratio, in operation S2. Here, the actual size of the mobile terminal 10 may be obtained from the device type information of the mobile terminal 10 that is stored in advance in the database 15. When the actual size of the mobile terminal 10 is not obtained from the device type information, the information may be separately input by the user. The ratio of the size of the mobile terminal 10 in the picture to the actual size of the mobile terminal 10, is identical to a ratio of a size of the target 30 of measurement in the picture to a size of the target 30 of the measurement. Therefore, the size of the target 30 of measurement may be estimated based on the ratio. The size of the target 30 of measurement estimated by applying the ratio is referred to as an estimated size (Estimated Length (EL)).

When the ratio is applied, an error may occur due to a difference between a distance from the mirror 2 to the mobile terminal 10 and a distance from the mirror 2 to the target 30 of measurement. Therefore, an Actual Length (AL, Actual Length) of the target 30 of measurement may be calculated by correcting the difference between the distance from the mirror 2 to the mobile terminal 10 and the distance from the mirror 2 to the target 30 of measurement, with respect to the estimated size (EL) in operations S3 through S6.

An operation of calculating the actual length (AL) of the target 30 of measurement by correcting the difference in distance may include obtaining the distance between the mirror 2 and the mobile terminal 10 in operation S3, obtaining the distance between the mirror 2 and the target 30 of measurement in operation S4, obtaining an error (PDA, Phone Distance Adjustment) associated with the difference between the distance from the mirror 2 to the mobile terminal 10 and the distance from the mirror 2 to the target 30 of measurement in operation S5, and correcting the obtained error (PDA) with respect to the estimated size (EL) in operation S6.

The error (PDA) associated with the difference in distance may be obtained from error data that is obtained in advance through experimentation, based on the distance (MTP) between the mirror 2 and the mobile terminal 10, and the distance (MTO) between the mirror 2 and the target 30 of measurement. The error data is stored in the database 15. When the distance from the mirror 2 to the mobile terminal 10 and the distance from the mirror 2 to the target 30 of measurement are given, the error (PDA) associated with the difference in distance may be obtained.

Figure 5:
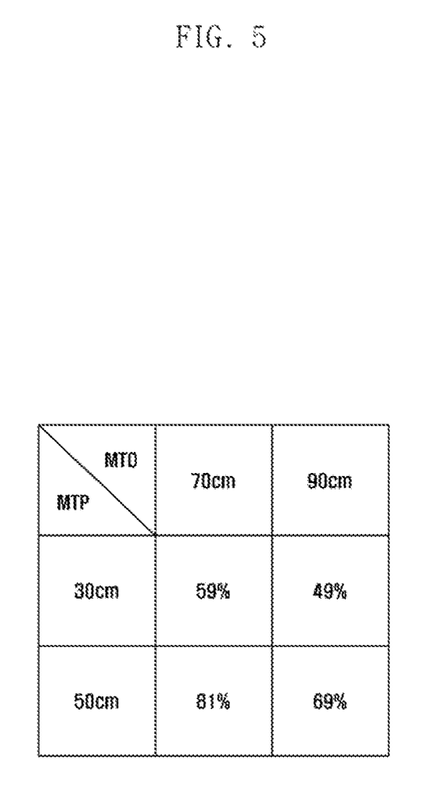
FIG. 5 is a diagram illustrating an example of an error expressed in a percentage, which is associated with a difference in distance, according to an embodiment of the present invention.

FIG. 5 illustrates an example of an error expressed in a percentage, which shows how small the estimated size (EL) is as compared to the actual size (AL), based on a difference in distance, through experimentation.

A result of the experimentation associated with the error may be changed by software of the mobile terminal 10, a camera of the mobile terminal 10, a thickness of the mirror 2, and the like.

Referring to FIG. 5, when a distance (MTP) between the mirror 2 and the mobile terminal 10 is 30 cm and a distance (MTO) between the mirror 2 and the target 30 of measurement is 70 cm and 90 cm, the percentage of an error indicating a percentage of an estimated size (EL) to an actual size (AL) is 59% and 49%. Conversely, when the distance (MTP) between the mirror 2 and the mobile terminal 10 is 50 cm, as the distance (MTO) between the mirror 2 and the target 30 of measurement is extended from 70 cm to 90 cm, the percentage of the estimated size (EL) to the actual size (AL) is changed from 81% to 69%. That is, the percentage of the error is changed based on a difference between the distance (MTP) from the mirror 2 to the mobile terminal 10 and the distance (MTO) from the mirror 2 to the target 30 of measurement. Therefore, it is important to accurately know both the distance (MTP) between the mirror 2 and the mobile terminal 10 and the distance (MTO) between the mirror 2 and the target 30 of measurement.

Referring to FIG. 2, a method of obtaining an actual horizontal length (AL) of the target 30 of measurement will be described.

First, a horizontal length (EL1) of the target 30 of measurement may be estimated using the ratio of the size of the mobile terminal 10 in the picture to the actual size of the mobile terminal 10. The size of the mobile terminal 10 in the picture may be obtained using universal software. The universal software includes all programs that may be capable of obtaining a pixel value of a target from a picture or an image. A pixel value associated with the size of the mobile terminal 10 in the picture may be obtained through the universal software and thus, the ratio of the pixel value associated with the size of the mobile terminal in the picture to the actual size of the mobile terminal 10 may be obtained. A pixel value associated with the horizontal length of the target 30 of measurement in the picture is known and thus, the horizontal length (ED1) of the target 30 of measurement may be estimated using the ratio. A estimation equation of the horizontal length (ED1) of the target 30 of measurement is as follows.

(Estimation Equation)

the actual size of the mobile terminal: the pixel value associated with the size of the mobile terminal in the picture=the actual size of the target of measurement: the pixel value associated with the size of target of measurement in the picture.

The actual length (AL) may be calculated by adjusting the estimated horizontal length (EL1) with the error associated with the difference between the distance (MTP) from the mirror 2 to the mobile terminal 10 and the distance (MTO) from the mirror 2 to the target 30 of measurement.

To adjust the estimated length with the error associated with the difference in distance, in FIG. 2, a distance (MTP1) between the mirror 2 and the mobile terminal 10 and a distance (MTO1) between the mirror and the target 30 of measurement are obtained in operations S3 and S4.

The distance (MTP1) between the mirror 2 and the mobile terminal 10 may be obtained from distance data obtained in advance through experimentation, based on the ratio of the size of the mobile terminal 10 in the picture to the actual size of the mobile terminal 10. That is, as the distance (MTP1) between the mirror 2 and the mobile terminal 10 becomes close, the ratio becomes low, and as the distance (MTP1) between the mirror 2 and the mobile terminal 10 becomes distant, the ratio becomes high. Accordingly, when the ratio is given, the distance (MTP1) between the mirror 2 and the mobile terminal 10 may be obtained. Therefore, the distance data associated with the distance (MTP1) between the mirror 2 and the mobile terminal 10 is obtained in advance through the experimentation and is stored in the database 15 in advance. Therefore, the distance (MTP1) between the mirror 2 and the mobile terminal 10 may be obtained from the distance data.

In FIG. 2, the picture is photographed by disposing the mobile terminal 10 significantly close to the target 30 of measurement and thus, the distance (MTO1) between the mirror 2 and the target 30 of measurement 30 is equal to a value obtained by adding the distance (MTP1) between the mirror 2 and the mobile terminal 10 and a thickness of the mobile terminal 10. Both the distance (MTP1) between the mirror 2 and the mobile terminal 10 and the thickness of the mobile terminal 10 are given and thus, the distance (MTO1) between the mirror 2 and the target 30 of measurement may be also obtained. However, this may not be limited thereto. When the picture is photographed by disposing the mobile terminal 10 significantly close to the target 30 of measurement, and it is determined that the thickness of the mobile terminal 10 is significantly small as compared to the size of the target 30 of measurement, the thickness of the mobile terminal 10 is ignored and it is determined that the distance (MTP1) between the mirror 2 and the mobile terminal 10 is equal to the distance (MTO1) between the mirror 2 and the target 30 of measurement.

After obtaining the distance (MTP1) between the mirror 2 and the mobile terminal 10 and the distance (MTO1) between the mirror 2 and the target 30 of measurement, an error (PDA) associated with a difference in distance may be obtained from the error data in operation S5.

The calculator 18 may calculate the actual horizontal length (AL) of the target 30 of measurement 30 by adjusting the estimated horizontal length (EL1) of the target 30 of measurement obtained from the above with the error (PDA) associated with the difference in distance, in operation S6. An estimation equation is as follows.

$$AL = EL/PDA \quad \text{(Estimation Equation)}$$

The actual horizontal length (AL) of the target 30 of measurement, which is calculated through adjusting the estimated horizontal length with the error (PDA) associated with the difference in distance, may be displayed through the display unit 14, in operation S7.

Referring to FIG. 3, a method of obtaining an actual lateral length (AL2) of the target 30 of measurement will be described.

First, the calculator 18 estimates a lateral length (EL2) of the target 30 of measurement using the ratio of the size of the mobile terminal 10 in the picture to the actual size of the mobile terminal 10 in operation S2.

The actual lateral length (AL2) may be calculated by adjusting the estimated lateral length with an error associated with a difference between a distance (MTP2) from the mirror 2 and the mobile terminal 10 and a distance (MTO2) from the mirror 2 and the target 30 of measurement, in operations S3 through S6.

To adjust the estimated length with the error (PDA) associated with the distance, in FIG. 3, the distance (MTP2) between the mirror 2 and the mobile terminal 10 and the distance (MTO2) between the mirror 2 and the target 30 of measurement are obtained in operations S3 and S4.

The distance (MTP2) between the mirror 2 and the mobile terminal 10 may be obtained from distance data that is obtained in advance through experimentation, based on the ratio of the size of the mobile terminal 10 in the picture to the actual size of the mobile terminal 10. Therefore, the distance (MTP2) between the mirror 2 and the mobile terminal 10 may be obtained from the distance data stored in the database 15.

In FIG. 3, the distance (MTO2) between the mirror 2 and the target 30 of measurement is a value obtained by subtracting a half (AL1) of the actual horizontal length (AL) of the target 30 of measurement from the distance (MTP2) between the mirror 2 and the mobile terminal 10. The distance (MTP2) between the mirror 2 and the mobile terminal 10 and the half (AL1) of the actual horizontal length (AL) of the target 30 of measurement are already obtained and thus, the distance (MTO2) between the mirror 2 and the target 30 of measurement may be also obtained.

After obtaining the distance (MTP2) between the mirror 2 and the mobile terminal 10 and the distance (MTO2) between the mirror 2 and the target 30 of measurement, an error (PDA) associated with a difference in distance may be obtained from the error data in operation S5.

The calculator 18 may calculate the actual horizontal length (AL2) of the target 30 of measurement 30 by adjusting the estimated horizontal length (EL2) of the target 30 of measurement obtained from the above with the error (PDA) associated with the difference in distance, in operation S6.

The calculated actual lateral length (AL2) may be displayed through the display unit 14, in operation S7.

As described above, the present invention is capable of correcting a distance without a separate distance measurement sensor for measuring a difference in a distance to the mirror between the mobile terminal 10 and the target 30 of measurement. Therefore, the present invention readily and accurately measures the actual length (AL) of the target 30 of measurement.

Although the present embodiment exemplifies that the database 15 and the calculator 18 are included in the mobile terminal 10, and the calculator 18 calculates the actual length of the target 30 of measurement based on information stored in the database 15, this may not be limited thereto, and the actual length of the target 30 of measurement may be calculated using a length measurement App. downloaded from an online app store using the mobile terminal 10. When the actual length of the target 30 of measurement is measured by downloading the length measurement App., the database 15 and the calculator 18 may be included in the central server 20. In addition, a calculation program may be included in the length measurement App., without a separate calculator, and thus, the mobile terminal 10 may calculate the actual length of the target 30 of measurement through the calculation program.

In addition, according to a length measurement method according to another embodiment of the present invention, a user directly obtains each pixel value of a size of a mobile terminal and a size of a target of measurement in a picture, estimates a length of the target of measurement using a ratio of the pixel value of the mobile terminal in the picture to an actual size of the mobile terminal, and adjusts the estimated length with an error so as to directly calculate the actual length.

In addition, the user prints out the picture photographed by the mobile terminal 10, obtains the size of the mobile terminal and the size of the target of measurement in the picture, estimates the length of the target of measurement using the ratio of the size of the mobile terminal in the picture to the actual size of the mobile terminal, and directly calculates the actual length by adjusting the estimated length with an error.

Although the present invention has been described with reference to the accompanying drawings, these are provided for illustrative purposes, and those skilled in the art would appreciate that various modifications and other equivalent embodiments are possible. Therefore, the scope of the present invention shall be determined by the technical ideas of the enclosed claims.

What is claimed is:

1. A method of measuring a length using a mobile terminal, the method comprising:
   photographing, by a user, a picture of the mobile terminal and a target of measurement together in front of a mirror, using a camera of the mobile terminal;
   obtaining a ratio of a size of the mobile terminal in the picture to an actual size of the mobile terminal, and estimating a length of the target of measurement from a size of the target of measurement in the picture, using the ratio; and
   calculating an actual length of the target of measurement based on the estimated length and a difference between a distance from the mirror to the mobile terminal and a distance from the mirror to the target of measurement,
   wherein calculating an actual length of the target of measurement comprises:
      obtaining the distance between the mirror and the mobile terminal;
      obtaining the distance between the mirror and the target of measurement
      obtaining an error associated with the difference between the distance from the mirror to the mobile terminal and the distance from the mirror to the target of measurement; and
      adjusting the estimated length with the error,
   wherein obtaining the distance between the mirror and the target of measurement comprises:
      obtaining the distance between the mirror and the mobile terminal, and estimating the distance between the mobile terminal and the target of measurement,
   wherein photographing comprises:
      disposing the target of measurement in the forward direction, in front of the mirror, matching the center of the front side of the mobile terminal to the center of the front side of the target of measurement, and photographing a picture of the front side of the target of measurement; and
      disposing the target of measurement in a lateral direction in front of the mirror, matching the center of the lateral side of the mobile terminal to the center of the front side of the target of measurement, and photographing a picture of the lateral side of the target of measurement,
   wherein obtaining the distance between the mirror and the target of measurement in the lateral side picture, comprises:
      estimating an actual horizontal length of the target of measurement from the front side picture;
      estimating a distance between the mirror and the mobile terminal from the lateral side picture; and
      subtracting a half of the actual horizontal length of the target of measurement obtained from the front side picture, from the distance between the mirror and the mobile terminal, obtained from the lateral side picture.

2. The method of claim 1, wherein the actual size of the mobile terminal is obtained from device type information of the mobile terminal.

3. The method of claim 1, further comprising:
   executing, by the user, a length measurement Application (App.) downloaded by the mobile terminal.

4. The method of claim 1, wherein the error is obtained from error data that is obtained in advance through experimentation based on the difference between the distance from the mirror to the mobile terminal and the distance from the mirror to the target of measurement.

5. The method of claim 4, wherein the error data is stored in at least one of the mobile terminal and a central server that communicates with the mobile terminal.

6. The method of claim 1, wherein obtaining the distance between the mirror and the mobile terminal comprises:
   obtaining the distance between the mirror and the mobile terminal from distance data that is obtained in advance through experimentation, based on the ratio of the size of the mobile terminal in the picture to the actual size of the mobile terminal.

7. The method of claim 6, wherein the actual size of the mobile terminal is obtained from device type information of the mobile terminal stored in at least one of the mobile terminal and a central server that communicates with the mobile terminal.

8. The method of claim 6, wherein the distance data is stored in at least one of the mobile terminal and a central server that communicates with the mobile terminal.

9. The method of claim 6, wherein the mobile terminal sets a resolution for photographing to a resolution applied when the distance data is established.

10. The method of claim 1, wherein estimating the length of the target of measurement and the calculating the actual length of the target of measurement are executed by at least one of the mobile terminal and a central server that communicates with the mobile terminal.

11. The method of claim 1, wherein estimating the length of the target of measurement and calculating the actual length of the target of measurement are executed by the user who uses the mobile terminal.

12. The method of claim 11, wherein the user prints out the picture, directly measures a size of the mobile terminal in the printed picture, and obtains a ratio of the size of the mobile terminal in the picture to the actual size of the mobile terminal.

13. The method of claim 11, wherein the user obtains a pixel value associated with the size of the mobile terminal in the picture using software stored in advance, and obtains the ratio of the size of the mobile terminal in the picture to the actual size of the mobile terminal.

* * * * *